United States Patent [19]

White et al.

[11] Patent Number: 4,483,693

[45] Date of Patent: * Nov. 20, 1984

[54] REFORMING OF HYDROCARBONS IN THE PRESENCE OF SULFUR

[75] Inventors: Gerald A. White, Los Angeles; Theodore R. Roszkowski, Malibu, both of Calif.; Harold W. Fleming, Jefferson Town, Ky.

[73] Assignee: The Ralph M. Parsons Co., Pasadena, Calif.

[*] Notice: The portion of the term of this patent subsequent to Dec. 28, 1993 has been disclaimed.

[21] Appl. No.: 380,236

[22] Filed: May 20, 1982

Related U.S. Application Data

[63] Continuation of Ser. No. 98,231, Nov. 28, 1979, abandoned, which is a continuation of Ser. No. 899,729, Apr. 24, 1978, abandoned, which is a continuation of Ser. No. 741,752, Nov. 15, 1976, abandoned, which is a continuation-in-part of Ser. No. 625,878, Oct. 28,1975, Pat. No. 3,999,961, which is a continuation-in-part of Ser. No. 525,483, Nov. 20, 1974, abandoned.

[51] Int. Cl.$^3$ ............................................. C01B 2/14
[52] U.S. Cl. .................................... 48/213; 48/214 A
[58] Field of Search ..................... 48/214 A, 215, 213, 48/214 R, 197 R; 252/373; 260/449 M

[56] References Cited

U.S. PATENT DOCUMENTS

| | | | |
|---|---|---|---|
| 2,830,880 | 4/1958 | Shapleigh | 48/214 A |
| 3,103,423 | 9/1963 | Pearce | 48/214 A |
| 3,567,411 | 3/1971 | McMahon | 48/214 A |
| 3,817,726 | 6/1974 | Yamaguchi et al. | 48/214 A |
| 3,904,387 | 9/1975 | Kertamus et al. | 48/210 |
| 3,948,762 | 4/1976 | Hayes | 48/214 A |
| 3,999,961 | 12/1976 | White et al. | 48/214 A |

Primary Examiner—George Yeung
Attorney, Agent, or Firm—Christie, Parker & Hale

[57] ABSTRACT

Hydrogen sulfide replaces a portion of the water required to suppress the formation of carbon in gas phase catalytic reforming and hydrocracking of hydrocarbons, particularly aromatics. Hydrogen is present to prevent carbon formation from the aromatic hydrocarbons. The support used for the catalyst is a gamma alumina, delta alumina, theta alumina or mixtures thereof.

19 Claims, No Drawings

REFORMING OF HYDROCARBONS IN THE PRESENCE OF SULFUR

CROSS-REFERENCE TO RELATED APPLICATIONS

This is a continuation of application Ser. No. 98,231, filed Nov. 28, 1979, now abandoned, which is a continuation of application Ser. No. 899,729, filed Apr. 24, 1978, now abandoned, which is a continuation of application Ser. No. 741,752 filed Nov. 15, 1976, now abandoned, which is a continuation-in-part of application Ser. No. 625,878, filed Oct. 25, 1975, now U.S. Pat. No. 3,999,961, which is a continuation-in-part of application Ser. No. 525,483, filed Nov. 20, 1974, now abandoned.

BACKGROUND OF THE INVENTION

The present invention is directed to the prevention of carbon formation in gas phase reforming catalytic operations at temperatures above about 900° F. Reforming is the conversion of high molecular weight hydrocarbons, such as naphtha and crude oil by reaction with steam to lower molecular weight species, such as methane or the conversion of any hydrocarbon to carbon oxides and hydrogen. A particular example is the reforming of methane to hydrogen and the oxides of carbon. Hydrocracking is a form of reforming which includes the conversion of heavier hydrocarbons to lower molecular species by reaction with hydrogen.

The catalytic reforming of natural gas, refinery gases, liquefied petroleum gases and naphthas is practiced commercially for the production of syngases or "rich" gases which are used for the production of hydrogen, ammonia, methanol and other chemicals. Conventionally, the reforming reaction occurs on a nickel-type catalyst in the presence of steam at temperatures ranging from 900° F. to approximately 1600° F. Excess steam over the stoichiometric quantity required for the reforming reaction is used, not only to achieve a high ddgree of conversion to syngas, but also to assist in the prevention of carbon formation from the syngas produced or from a syngas containing hydrogen and carbon oxides which may be added as reactants in the reforming process.

In U.S. Pat. No. 3,103,423 to Pearce, it is disclosed that the presence of sulfur in an amount up to 10 ppm can be tolerated during the reforming of light distillate hydrocarbons and that as a consequence water as steam can be reduced.

Of the hydrocarbons which may be subject to reforming, the aromatic hydrocarbons, particularly benzene, are the most difficult to reform.

In our prior copending application, it was disclosed that the inclusion of a source of hydrogen as part of the feed and present in an amount sufficient for the stoichiometric conversion of carbon in the hydrocarbons to be reformed to methane enables, in the presence of hydrogen sulfide, a high degree of conversions of the more difficult to reform aromatic hydrocarbons at reduced steam requirements. Hydrogen can be provided as such, as carbon monoxide which reacts with water to yield hydrogen in the presence of the reforming agent, as well as part of a syngas, i.e. a mixture comprising hydrogen and the oxides of carbon.

Reducing steam load results in an increase of thermal efficiency for the process and reduced cost of excess steam recovery and separation as a condensate from the product gas.

SUMMARY OF THE INVENTION

In accordance with the present invention, in a process wherein a hydrocarbon, in the presence of water as steam, is reformed in the presence of a reforming catalyst at a temperature from about 900° to about 1600° F., the water present in excess of the stoichiometric amount required for reforming and for the purpose of suppressing the formation of carbon is at least in part supplanted by relatively minor amounts of hydrogen sulfide provided there is also present in the reaction mixture a source of hydrogen in the form of free hydrogen and/or carbon monoxide in a quantity sufficient to satisfy the stoichiometry required for converting all of the carbon in the feed to methane, and there is employed as a support for the catalyst an alumina having a surface area of at least 30 m$^2$/g, preferably from bout 30 to about 160 m$^2$/g or more and preferably from about 50 to about 160 m$^2$/g, which alumina is the gamma form of alumina, the delta form of alumina, the theta form of alumina or mixtures thereof. The preferred catalysts employed contain at least one metal of the third period of Group VIII of the Periodic Table of Atomic Weight, normally in an amount of from 5 to 50% by weight based on the weight of such metals and the support.

While functional for reforming all hydrocarbons, the process is particularly utile for reforming of aromatic hydrocarbons.

The amount of hydrogen sulfide used to prevent carbon formations is at least 1 part per million and preferably from about 2 to about 5000 parts per million, more preferably from about 5 to about 100 parts per million, depending on the nature of reaction conditions and the amount of water to be replaced.

The function of the hydrogen sulfide is to prevent the formation of carbon due to the interaction of the oxides of carbon with themselves or with hydrogen. In addition, the reforming catalyst may be modified by other metal oxides or carbonates especially alkali metal oxides or carbonates, such as potassium oxide or potassium carbonate to prevent the formation of carbon from heavy hydrocarbons as well as from other mixed species, such as phenols, tars, pitch and the like. Barium oxide and magnesium oxide may also be beneficial. The supports as compared to other aluminas are more active and mechanically and thermally stable at temperatures up to at least 1800° F.

The hydrogen sulfide used to preclude carbon formation during reforming can be present in the feed or added from any convenient sulfur source. As reforming occurs under highly reducing conditions, any sulfur species such as sulfur dioxide, carbonyl sulfide, carbon disulfide, thiophenes, mercaptans and the like will be reduced to hydrogen sulfide to suppress carbon formation.

Because reforming involves reaction of hydrocarbons having a molecular weight greater than methane, there coexists the problem of carbon formation from the hydrocarbons. This is controlled by the presence of hydrogen as free hydrogen and/or carbon monoxide during the reforming reactions. Hydrogen may be provided, in the instance where the hydrocarbons have an end point up to about 350° F., by reaction of hydrocarbons with water in the absence of sulfur to yield hydrogen and carbon monoxide. Hydrogen may also be provided by combining a hydrogen containing syngas with the feed alone or with addition of free hydrogen. The amount of hydrogen provided either as free hydrogen and/or carbon monoxide must be sufficient to satisfy the stoichiometry of converting all the carbon in the feed to methane. At least about a 10% molar excess of hydrogen or its equivalent is preferred. Carbon monoxide provides hydrogen in the presence of the catalyst as a consequence of its reaction with water to yield carbon dioxide and hydrogen.

Through the use of hydrogen sulfide in combination with hydrogen to suppress carbon formation, there is avoided the cost of generating steam for the purpose of controlling carbon formation and the cost of recovering the steam from the product gas stream. The presence of hydrogen is also essential to the reforming of aromatic hydrocarbons.

DETAILED DESCRIPTION

According to the present invention, hydrogen sulfide in combination with a source of hydrogen as components of the gas stream undergoing a reforming reaction in the presence of a supported catalyst, in which the support is an alumina in the gamma, delta and theta forms and mixtures thereof, enable elimination of all or a major portion of the water used to control the formation of carbon.

Processes to be benefited in accordance with the practice of this invention are those which involve reforming of a hydrocarbon in the presence of at least water and catalyst at temperatures from about 900° to about 1600° F., preferably from about 1000° to about 1500° F. Pressures generally range from about atmospheric to about 1200 psia or more.

As used herein, by the term "reforming", there is meant the conversion of high molecular weight hydrocarbons to lower molecular weight hydrocarbon species as well as the oxides of carbon. Methane is normally the predominant residual hydrocarbon species present in the product gas when a "rich gas" is produced by reforming. Included within the meaning of reforming are hydrocracking reactions.

The hydrocarbons which are subject to reforming can be varied widely. Examples are methane, naphtha, gas oil, crude oils, distillate fractions, residual fuel oil, shale oil, tar sands and the like.

Particularly benefited are processes where the hydrocarbons present include aromatics. By the term "aromatics" there is meant benzene and its homologs and condensed or fused compounds in which two or more carbon atoms are shared in common by two or more atomatic rings. The aromatics include substituted and unsubstituted compounds. Such compounds, as is known in the art, are most difficult to reform, but are readily reformable in the presence of both hydrogen and hydrogen sulfide. Illustrative of the aromatics reformed in accordance with the invention there may be mentioned, benzene, nphthalene, anthracene, phenol, aniline and the like.

The reforming catalysts employed are those which typically contain a metal from the third period of Group VIII of the Periodic Table with Atomic Weights as published in Perry's, *Chemical Engineers Handbook,* Third Edition, McGraw-Hill, 1950, on an alumina in the gamma form, the delta-form, the theta form or mixtures therof.

The support for the catalyst is prepared from a selected pure alumina made rom a finely crystallized alumina monohydrate such as boehmite and ultrafine boehmite. It is essential to use a pure, single phase alumina hydrate that is transformed successively into a gamma and/or a delta form following dehydration by calcining. The gamma form exists at temperatures up to about 800° C. and the delta form up to about 1050° C. At the temperature interface of about 800° C., a mixture of the two forms exist. The normally calcined alumina which may be the gamma and/or delta form is mechanically and thermally stable up to aproximately 1050° C. as demonstrated by retaining a surface area in the range of about 40 to about 160 $m^2/g$ or more, preferably from about 50 to about 160 $m^2/g$ or more. At temperatures above 1050° C. almost simultaneous transformation to the theta then alpha form occurs. With transformation to the alpha form, surface area of the alumina is reduced to less than 10 $m^2/g$. The reduction in surface area of the support results in a corresponding loss in catalyst activity.

A stable theta form, with preserved mechanical properties and a surface area of 30 $m^2/g$ or more is provided by treating or modifying the pure boehmite alumina hydrate before or after dehydration with rare earth oxides, such as those whose cation have an Atomic Number between 59 and 72. The theta form so prepared is thermally and mechanically stable and will retain a surface area up to a temperature of approximately 1250° C. Modification of the precursor also aids in retention of surface area for the gamma and delta forms.

The support of these are described in greater detail in Chapter 12 of "Catalysts for the Control of Automobile Pollutants", James E. McEvoy, ACS Advances in Chemistry Series, Number 143.

The presently preferred catalyst supports are SCS 59 Spheralite, SCS 109 RT Spheralite, and G PS 300 extradate supplied by Rodia, Inc., Monmouth Junction, N.J., Chemical Division of Rhone-Poulenc; FN 7085 and SN 7086, supplied by Catalyst and Chemicals, Inc. Louisville, Ky., and Alumina Hydrate SA-Medium supplied by Kaiser Aluminum.

Using an alumina support of the invention, the catalyst is prepared by dipping the support into an aqueous solution of one or more soluble Group VIII metal satls normally containing 5 to 20 weight percent of the metal. The dipped particles are then calcined at temperatures in the range of 300° to 450° C. to convert the salt to the oxide. Prior to use, the oxide is reduced with hydrogen at a temperature up to 1200° F. The catalyst provided contains a total of from about 5 to about 50% by weight, preferably from 5 to about 35% by weight of the Group VIII metals based on the weight of the Group VIII metals and the support. The preferred metals are nickel, cobalt and mixtures thereof with nickel being preferred. Other metals may be present including as modifying metals the alkali oxides and carbonates such as potassium oxide and potassium carbonate. Other metals such as barium oxide, magnesium oxide and the like may be used.

The catalyst of this invention may be used at a temperature up to the temperature at which transformation to the alpha from occurs preferably from 900° F. to about 1600° F.

The gas streams undergoing reforming comprise a mixture of the hydrocarbons, and water as steam, and occur in the presence of hydrogen sulfide and a source of hydrogen. Water is excess of that stoichiometrically required for reforming reactions is present for the purpose of controlling carbon formation from the interaction of the oxides of carbon with themselves or with hydrogen.

Carbon as is well known has always presented a problem in reforming operations, particularly where catalysts are employed since carbon deposition onto the catalyst will promote further carbon deposition leading to termination of catalyst activity.

It is possible to predict the regions where carbon will form by a consideration of operating pressure, temperature and the principle contributors to the formation of carbon in the product gas from reforming, namely hydrogen, methane, carbon monoxide, carbon dioxide, steam and carbon itself. These constituents provide the three elements, carbon, hydrogen and oxygen necessary to enter into the complex chemical reactions which lead to carbon formation.

Since the number of chemical elements can be reduced to three, namely carbon, hydrogen and oxygen, the raw materials, their intermediate and final products and all mixtures thereof can be represented as unique points of composition on a ternary diagram of the three elements for at least the reactions occurring during reforming.

The establishment of these points, however, can only be determined by an iterative convergence method involving the solution of a set of simultaneous non-linear equations:

The series of equations to be solved are as follows:

$$(CH_4) + (CO) + (CO_2) + (C) = (C^*) \quad (1)$$

$$2(H_2) + 4(CH_4) + 2(H_2O) = (H^*) \quad (2)$$

$$(CO) + 2(CO_2) + (H_2O) = (O^*) \quad (3)$$

$$K_1 = \frac{(H_2)^3 (CO)}{(CH_4)(H_2O)} \cdot \frac{(ATM)^2}{(TOT)^2} \quad (4)$$

$$Log_{10} K_1 = A - K_1 + \frac{B - K_1}{°R} \quad (5)$$

$$K_2 = \frac{(H_2)(CO_2)}{(CO)(H_2O)} \quad (6)$$

$$Log_{10} K_2 = A - K_2 + \frac{B - K_2}{°R} \quad (7)$$

$$K_3 = \frac{(CO_2)}{(CO)^2} \cdot \frac{(TOT)}{(ATM)} \quad (8)$$

$$Log_{10} K_3 = A - K_3 + \frac{B - K_3}{°R} \quad (9)$$

$$(TOT) = (H_2) + (CH_4) + (CO) + (CO_2) + (H_2O) \quad (10)$$

$$(C) = 0 \quad (11)$$

wherein:
($C^*$)=total atoms carbon
($H^*$)=total atoms hydrogen
($O^*$)=total atoms oxygen
($H_2$)=moles of hydrogen
($CH_4$)=moles of methane
($CO$)=moles of carbon monoxide
($CO_2$)=moles of carbon dioxide
($H_2O$)=moles of water
($TOT$)=total moles of gas
($C$)=atoms of solid carbon
$K_1$=reforming equilibrium constant for conversion of $CH_4$ to $H_2$ and CO $A-K_1$=constant term of equation for reforming equilibrium constant for conversion of $CH_4$ to $H_2$ and CO
$B-K_1$=slope of equation for reforming equilibrium constant for conversion of $CH_4$ to $H_2$ and CO
$K_2$=water gas shift equilibrium constant for conversion of CO to $H_2$
$A-K_2$=constant term of equation for water gas shift equilibrium constant for conversion of CO to $H_2$
$B-K_2$=slope of equation for water gas shift equilibrium constant for conversion of CO to $H_2$
$K_3$=equilibrium constant for carbon monoxide autoreduction to C
$A-K_3$=constant term of equation for equilibrium constant for carbon monoxide autoreduction to C
$B-K_3$=slope of equation for equilibrium constant for carbon monoxide autoreduction to C
°R.=degrees Rankine
(ATM)=system pressure-atmosphere The mathematical system consists of twenty-one variables and eleven equations. The variables must be specified to make the system determinate. Six of the variables are the constants of the equations for equilibrium constants and fixed. Four more variables remain to be set. If the amounts of the three elements and the system pressure are set, then solution of the equations provides the temperature at which solid carbon will be deposited.

Alternatively, if the system temperature is specified, then a solution of the equation leads to the pressure at which solid carbon begins to deposit.

Finally, by specifying system pressure and temperature and two of the three elements, the equations yield the quantity of the third element at which carbon deposition is incipient. From the latter, the water required as steam can be determined.

The preceding equations include all significant species and reactions. The conditions to which they pertain are those of complete equilibrium, corresponding to the condition of a gas leaving a reaction zone. The gas stream entering a reaction zone is, however, removed from equilibrium. The only reactions during methanation which could possibly lead to the production of carbon are the decomposition of methane, the autoreduction of carbon monoxide and/or the reductions of carbon monoxide and/or carbon dioxide by hydrogen. The thermodynamic potentials for the formation of carbon from all these components during methanation are predictable from the mathematical derivation described above.

The system of mathematical equations presented is nonlinear which prevents their solution by any of the standard methods for solving sets of simultaneous equations such as for linear systems. They are however of a form which permits an iterative technique to be used for their solution and makes use of a digital computer desirable.

However, the ready availability of digital computers in the chemical industry today makes their solution easy.

One can from the above analysis for a given gas composition, operating pressure and reaction temperature determine the amount of water required to suppress the formation of carbon. The excess water present in the gas stream to control the formation of carbon is provided as steam and represents an additional cost to the methanation operation. There is also the cost of condensing and recovering the excess water from the product gas stream.

In accordance with the practice of this invention, water above that stoichiometrically required for the reforming reactions and present to suppress carbon formation is replaced in whole or in part by hydrogen sulfide.

The amount of hydrogen sulfide found to be effective to retard the formation of carbon is as little as one part per million, and can be as high as 10,000 ppm or more. A preferred range is from about 2 to about 5000 parts per million, more preferably from about 5 to about 100 parts per million. Although there is no limit as to the amount of hydrogen sulfide which can be present, it has been found that amounts in excess of 50 parts per million will retard the rates of reaction over the catalyst. Any reduction in reaction rates or productivity is, however, compensated for by the amount of water conserved, as the water required to suppress carbon formation can be effectively eliminated.

The manner in which sulfur is introduced into the gas stream is not critical, as reforming occurs under reducing conditions and any sulfur bearing compounds will be rapidly converted to hydrogen sulfide. It can, therefore, be introduced in the form of hydrogen sulfide itself as carbonyl sulfide, carbon disulfide, mercaptans, sulfur dioxide, thiophenes and the like.

Important to the practice of this invention is that hydrogen sulfide is to replace the water present for control of carbon, and not provided in adddition to the water. If the water normally required for carbon control is present, and hydrogen sulfide is also present within the range set forth above there will be a diminution of productivity. As the amount of water is reduced and replaced by hydrogen sulfide, production will remain at high levels.

In replacing the excess water required to suppress carbon formation, a material reduction in the cost of reforming hydrocarbons can be realized. The product formed, however, is normally required to be substantially sulfur free. Following reforming, therefore, the hydrogen sulfide can be removed by conventional means of absorption as well as the use of zinc oxide as a chemical extractant.

Aside from the tendency of the oxides of carbon to interact with themselves or with hydrogen to form carbon, there exists the separate problem of carbon formation from the hydrocarbons undergoing reforming. To cope with this, hydrogen must be present during reforming to sustain conversion. The source of hydrogen used may be free hydrogen or carbon monoxide. In the instance where the hydrocarbons are light, i.e. containing constituents having an end point up to about 350° F., the hydrogen may be provided by the hydrocarbons which react, in part, with water in the presence of the catalyst and in the absence of sulfur to form hydrogen and the oxides of carbon. As this is rapid, the lighter hydrocarbons will generate sufficient hydrogen to prevent carbon formation external of the reforming reactor where reforming occurs in the presence of sulfur.

Although hydrogen purchased or produced from any source, as above, may be utilized, a most convenient source of hydrogen is a syngas which comprises hydrogen and the oxides of carbon. A syngas, if available, is especially preferred since the constituents will undergo exothermic methane forming reactions in the presence of the catalyst employed, thereby providing at least a portion of the endothermic heat of reforming.

There is no upper limit to the amount of hydrogen which may be present during reforming since excess hydrogen will be part of the fuel value of the product gas. In general, the minimum amount to be provided is that stoichiometrically required to satisfy the hydrogen deficiency of empirical formula of the hydrocarbon feed to convert all the carbon present to methane. For example, if the assay of the feed reveals it to have an empirical formula of $C_6H_6$, the minimum mole ratio of hydrogen to hydrocarbon would be 9:1. To assure trouble free operation, hydrogen should be provided in an amount of about 10% in excess of the minimum stoichiometric amount required.

An advantage of the catalysts employing the supports of this invention as compared to those disclosed in our prior copending application is high activity at low initiation temperatures. This is important in the reforming of high boiling hydrocarbons. High boiling hydrocarbons are thermally unstable and tend to form polymers which are precursors to carbon formation. Carbon formation can be initiated in a preheater and accelerated when the feed is contacted with the catalysts. This can be effectively avoided.

EXAMPLE

There was employed a nickel catalyst supported on an alumina base in the gamma-delta form. For steam reforming of benzene, reforming occurred in the presence of less than 10 ppmv of sulfur as hydrogen sulfide. Reactions were initiated at a temperature in the range of about 1100° F. The results are shown in Table I.

TABLE I

| Component | Feed Gas | Product Gas |
|---|---|---|
| $H_2$ | 31.3 | 64.0 |
| CO | 59.5 | 28.3 |
| $CO_2$ | 0.1 | 34.3 |
| $CH_4$ | 8.0 | 11.8 |
| $C_6H_6$ | 1.1 | — |
| $H_2O$ | 110.0 | 73.0 |
| Inlet temperature, °F. | | 1100 |
| Outlet temperature, °F. | | 1460 |
| Pressure, psia | | 400 |

What is claimed is:

1. In a process for the reforming of hydrocarbons wherein a gaseous stream comprising a hydrocarbon and water as steam is contacted with a supported reforming catalyst comprising at least one metal from the third period of Group VIII of the Periodic Table on an alumina support at a temperature from about 900° F. to about 1600° F., and in which water is present in an excess amount above the stoichiometric amount required for reforming to prevent the formation of carbon, the improvement which comprises providing in the gaseous stream undergoing reforming at least 1 part per million by volume hydrogen sulfide in place of at least a portion of the excess water required to prevent carbon formation, and during reforming a source of hydrogen selected from the group consisting of free hydrogen, carbon monoxide which provides hydrogen by reaction with water, and mixtures thereof in an amount at least sufficient for the stoichiometric conversion of all of the carbon in the hydrocarbon to methane, employing as the alumina support for the reforming catalyst, an alumina having a surface area of at least 30 $m^2/g$, and selected from the group consisting of the gamma form of alumina, the delta form of alumina, the theta form of alumina and mixtures thereof, said alumina being formed by calcining of an alumina monohydrate.

2. A process as claimed in claim 1 in which the alumina support is modified with rare earth metal oxides.

3. A process as claimed in claim 1 in which the alumina is modified by the addition of a potassium compound selected from the group consisting of a potassium oxide, potassium carbonate and mixtures thereof.

4. A process as claimed in claim 1 in which a portion of the excess water is replaced by hydrogen sulfide in an amount of from about 2 to about 5000 parts per million.

5. A process as claimed in claim 1 in which a portion of the excess water is replaced by hydrogen sulfide in an amount of from about 5 to 100 parts per million.

6. A process as claimed in claim 1 in which reforming occurs in a temperature range of from 1000° F. to about 1500° F.

7. A process as claimed in claim 1 in which the hydrogen sulfide is formed from sulfur species selected from the group consisting of carbonyl sulfide, carbon disulfide, sulfur dioxide, thiophenes, mercaptans and mixtures thereof.

8. A process as claimed in claim 3 in which the hydrocarbon includes aromatic hydrocarbons.

9. In a process for the reforming of hydrocarbons wherein a gaseous stream comprising a hydrocarbon and water as steam is contacted with a supported reforming catalyst comprising at least one metal from Group VIII of the Periodic Table on an alumina support at a temperature from about 900° F. to about 1600° F., and in which water is present in an excess amount above the stoichiometric amount required for reforming to suppress the formation of carbon, the improvement which comprises replacing at least a portion of the excess water required to prevent the formation of carbon with from about 2 to about 5000 parts per million by volume hydrogen sulfide, providing a source of hydrogen, in the form of a syngas comprised of hydrogen and carbon monoxide which provides hydrogen by reaction with water, in an amount at least sufficient for the stoichiometric conversion of the carbon in the hydrocarbon to methane under net exothermic conditions and employing as the alumina support for the reforming catalyst an alumina having a surface area from about 30 to about 160 m$^2$/g and selected from the group consisting of the gamma form of alumina, the delta form of alumina, the theta form of alumina and mixtures thereof, and formed by calcination of an alumina monohydrate.

10. A process as claimed in claim 9 in which the alumina is modified by the addition of rare earth metal oxides.

11. A process as claimed in claim 9 in which the alumina is modified by the addition of a potassium compound selected from the group consisting of a potassium oxide, potassium carbonate and mixtures thereof.

12. A process as claimed in claim 9 in which reforming occurs in a temperature range of from 1000° F. to about 1500° F.

13. A process as claimed in claim 9 in which a portion of the excess water is replaced by hydrogen sulfide in an amount of from about 5 to about 100 parts per million.

14. A process as claimed in claim 9 in which the hydrogen sulfide is formed from sulfur species selected from the group consisting of carbonyl sulfide, carbon disulfide, sulfur dioxide, thiophenes, mercaptans and mixtures thereof.

15. A process for reforming aromatic hydrocarbons which comprises passing a gaseous stream comprising aromatic hydrocarbons and water as steam, hydrogen sulfide in a concentration of from about 2 to about 5000 parts per million by volume in place of at least a portion of the excess water required to prevent the formation of carbon from the aromatic hydrocarbon and a source of hydrogen being a syngas comprising hydrogen, carbon monoxide which provides hydrogen by reaction with water, and carbon dioxide, in an amount at least sufficient for the stoichiometric conversion of the carbon in the aromatic hydrocarbons to methane with a supported reforming catalyst comprising at least one metal from Group VIII of the Periodic Table on a support which is an alumina having a surface area from about 30 to about 160 m$^2$/g and selected from the group consisting of gamma alumina, delta alumina, theta alumina and mixtures thereof, and formed by calcination of an alumina monohydrate, said alumina modified by a potassium compound selected from the group consisting of potassium oxide, potassium carbonate and mixtures thereof, at a temperature of from about 900° F. to about 1600° F. to reform the aromatic hydrocarbons without the formation of carbon, the temperature at outlet being at least about 1460° F.

16. A process as claimed in claim 15 in which the alumina is modified rare earth metal oxides.

17. A process claimed in claim 15 in which a portion of the excess water is replaced by hydrogen sulfide in an amount of from about 5 to about 1000 parts per million.

18. A process as claimed in claim 15 in which reforming occurs in a temperature range of from 1000° F. to about 1500° F.

19. A process as claimed in claim 15 in which the hydrogen sulfide is formed from sulfur species selected from the group consisting of carbonyl sulfide, carbon disulfide, sulfur dioxide, thiophenes, mercaptans and mixtures thereof.

* * * * *